Patented Sept. 12, 1933

1,926,873

UNITED STATES PATENT OFFICE 1,926,873

SUBSTITUTED ALKYL-HYDROXY-
DIPHENYL METHANE

Emil Klarmann, Jersey City, and Louis William
Gates, Bloomfield, N. J., assignors to Lehn &
Fink, Inc., Bloomfield, N. J., a corporation of
Delaware No Drawing. Application March 29, 1932
Serial No. 601,884

9 Claims. (Cl. 260—64)

The present invention relates to certain hydroxy diphenyl methane derivatives having high bactericidal efficiency, and more particularly to chlorine substituted alkyl-hydroxy-diphenyl methanes.

In accordance with the present invention, we prepare chlorine substituted alkyl-hydroxy-diphenyl methanes, the chlorine being substituted in either nucleus, and we have found such compounds to constitute highly effective bactericidal agents. In the compounds prepared in accordance with the present invention, the alkyl and hydroxyl groups are substituted in the same nucleus, the chlorine atom being substituted either in this nucleus or in the other nucleus. Our invention also includes homologues of such compounds in which a hydrocarbon radical is substituted in the methylene group containing the two nuclei.

The compounds, in accordance with the present invention may be prepared, for example, by condensing benzyl chloride with an alkyl substituted phenol or phenolate, chlorine being substituted in either the nucleus of the benzyl chloride or that of the phenol or phenolate. The condensation may be effected by direct reaction, particularly in the case of the use of a phenolate, or in the presence of a suitable condensing agent, such as zinc, zinc chloride, or the chlorides of other heavy metals or sulfuric acid. If desired, the condensation may be effected with compounds into which chlorine has not been introduced, and the chlorination carried out after condensation.

The following examples illustrate the production of compounds in accordance with the present invention.

The sodium compound of para-chloro-ortho-cresol is suspended in toluene and treated with benzyl chloride in approximate equimolecular proportions, the latter being added slowly and with stirring to the former. The mixture is then heated moderately, say to 110° C. or thereabout, and stirred for a period of about 4 hours. The reaction mixture is then treated with water and benzol to remove impurities soluble therein, and the desired phenolic bodies are then extracted with an alkaline methyl alcohol solution, precipitated by acidification, and subjected to vacuum distillation. The desired product, which is 5-chlor-3-methyl-2-hydroxy-diphenylmethane, distills between 172 and 174° C. at 4.5 mm. Hg pressure and melts at 55° C. Its phenol coefficient with respect to B. typhosus is 16 and with respect to Staph. aureus 243.

The same compound may be prepared by condensing sodium ortho-cresolate with benzyl chloride and subsequently chlorinating the resulting product.

A further compound in accordance with the present invention may be prepared by condensing, in a similar manner, the sodium compound of para-chloro-meta-cresol with benzyl chloride. The resulting product, which is of an oily character and boils from 176 to 178° C. at 4.5 mm. Hg pressure is, we believe, a mixture of 5-chloro-4-methyl-2-hydroxy-diphenylmethane and 5-chloro-6-methyl-2-hydroxy-diphenylmethane. It has a high bactericidal value, particularly with regard to Staph. aureus. Its phenol coefficient with respect to B. typhosus is 17.2, and with respect to Staph. aureus is 403.

In a similar manner, 4'-chloro-3-methyl-2-hydroxy-diphenylmethane may be prepared by condensation of sodium ortho-cresolate with para-chloro-benzyl chloride. It boils at 167–172° C. at 4 mm. Hg and melts at 48° C. The phenol coefficient with respect to B. typhosus is 16, and with respect to Steph. aureus 243. By condensing para-chloro-benzyl chloride with ortho-cresol in the presence of a chloride of a heavy metal, such as zinc chloride, 4'-chloro-3-methyl-4-hydroxy-diphenylmethane may be prepared.

Corresponding ethyl, propyl, isopropyl, butyl and higher alkyl compounds may be prepared by using the corresponding alkyl substituted phenols instead of cresols or cresolates. Changes in the position of the substituting alkyl groups may be effected by employing the meta or para-cresols or other meta or para-substituted alkyl phenols.

Chlorine may be substituted in either nucleus and we have found that the effectiveness of compounds of this type against certain bacteria is unimpaired or may be improved by the substitution of additional halogens in either ring.

We claim:

1. As a composition of matter, a chlorine-substituted mono-alkyl-hydroxy-diphenylmethane, the chlorine being substituted in a nucleus thereof, said compound having a high bactericidal efficiency.

2. A chlorine substituted mono-methyl-hydroxy-diphenylmethane, the chlorine being substituted in a nucleus thereof, said compound having a high bactericidal efficiency.

3. As a composition of matter, an alkyl-hydroxy-diphenylmethane having a chlorine substituted in the nucedus containing the substituting hydroxyl group.

4. As a composition of matter, a methyl-hydroxy-diphenylmethane having a chlorine substituted in the nucleus containing the substituting hydroxyl group.

5. 5 - chloro - 3 - methyl - 2 - hydroxy - diphenylmethane.

6. 5 - chloro - 4 - methyl - 2 - hydroxy - diphenylmethane.

7. As a composition of matter, an alkyl-hydroxy-diphenylmethane having a chlorine substituted in the nucedus free from hydroxyl groups.

8. As a composition of matter, a methyl-hydroxy-diphenylmethane having a chlorine substituted in the nucleus free from substituting hydroxyl groups.

9. 4' - chloro - 3 - methyl - 4 - hydroxy - diphenylmethane.

EMIL KLARMANN.
LOUIS WILLIAM GATES.